(12) United States Patent
Tremblay

(10) Patent No.: US 8,810,572 B2
(45) Date of Patent: Aug. 19, 2014

(54) TESSELLATION CACHE FOR OBJECT RENDERING

(75) Inventor: Christopher Tremblay, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 13/286,030

(22) Filed: Oct. 31, 2011

(65) Prior Publication Data

US 2013/0106851 A1    May 2, 2013

(51) Int. Cl.
| | | |
|---|---|---|
| *G06T 15/50* | (2011.01) | |
| *G06T 17/20* | (2006.01) | |
| *G06T 15/00* | (2011.01) | |

(52) U.S. Cl.
CPC ............ *G06T 17/20* (2013.01); *G06T 15/005* (2013.01)
USPC ............ 345/423; 345/419; 345/422; 345/426

(58) Field of Classification Search
CPC ............................... G06T 19/00; G06T 17/20
USPC .................. 345/419, 423, 422, 426
See application file for complete search history.

(56) References Cited

U.S. PATENT DOCUMENTS

| | | | |
|---|---|---|---|
| 7,256,796 B1 * | 8/2007 | Bastos et al. ................... | 345/614 |
| 7,385,604 B1 * | 6/2008 | Bastos ........................... | 345/426 |
| 7,646,384 B2 * | 1/2010 | Anderson et al. ............. | 345/420 |
| 8,044,955 B1 * | 10/2011 | Yhann .......................... | 345/423 |
| 8,269,770 B1 * | 9/2012 | Carr et al. ..................... | 345/423 |
| 2005/0275760 A1 * | 12/2005 | Gritz et al. .................... | 348/746 |
| 2005/0280654 A1 * | 12/2005 | Boyd et al. .................... | 345/559 |
| 2006/0146057 A1 * | 7/2006 | Blythe .......................... | 345/506 |
| 2006/0244753 A1 * | 11/2006 | Boyd et al. .................... | 345/522 |
| 2008/0024495 A1 * | 1/2008 | Mech et al. .................... | 345/426 |
| 2008/0273034 A1 * | 11/2008 | Fenney et al. ................. | 345/423 |
| 2009/0237401 A1 * | 9/2009 | Wei et al. ...................... | 345/423 |
| 2009/0295798 A1 * | 12/2009 | Goel ............................. | 345/423 |
| 2010/0214294 A1 * | 8/2010 | Li et al. ......................... | 345/423 |
| 2011/0063294 A1 * | 3/2011 | Brown et al. .................. | 345/423 |
| 2011/0234592 A1 * | 9/2011 | Patel et al. ..................... | 345/426 |
| 2011/0285711 A1 * | 11/2011 | Kilgard ......................... | 345/426 |
| 2011/0285736 A1 * | 11/2011 | Kilgard ......................... | 345/584 |
| 2012/0086715 A1 * | 4/2012 | Patel et al. ..................... | 345/441 |
| 2012/0200569 A1 * | 8/2012 | Munkberg et al. ............ | 345/423 |

* cited by examiner

*Primary Examiner* — Kimbinh T Nguyen
(74) *Attorney, Agent, or Firm* — Kilpatrick Townsend & Stockton LLP

(57) ABSTRACT

A method of rendering an object comprises, with a processor, generating a data set that mathematically defines an object, tessellating the object into a number of smaller objects to form a number of data subsets, storing the data subsets in a memory cache, converting the data subsets into a rasterized object, and displaying the rasterized object on a display device. A system for rendering an object comprises a processor to generate a data set that mathematically defines an object, tessellate the object into a number of smaller objects to form data subsets, transform the data subsets using a linear operator, and store the data subsets in a memory cache, a graphics processor to convert the data subsets into a rasterized object and display the rasterized object on a display device and a memory cache to receive and store the data subsets.

16 Claims, 3 Drawing Sheets

TESSELLATION CACHE FOR OBJECT RENDERING

BACKGROUND

As computing devices have developed, they have become capable of displaying complex objects. Mathematically-defined formats of these objects are created and stored in a data file communicatively coupled to the computing device and may include such information as the geometry, texture, lighting, and shading characteristics of the object. In order to display these objects on a variety of computing devices, the object is transformed into a format that is easily displayed on a computing device. This process is called rendering, and the resultant object format is rasterized. Rendering can be a computationally expensive process that utilizes large amounts of computer bandwidth to perform. One method of simplifying the rendering process is tessellation. Tessellation reduces a complex object into simpler, more manageable units that can be converted more quickly by the processor.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Figure 1:
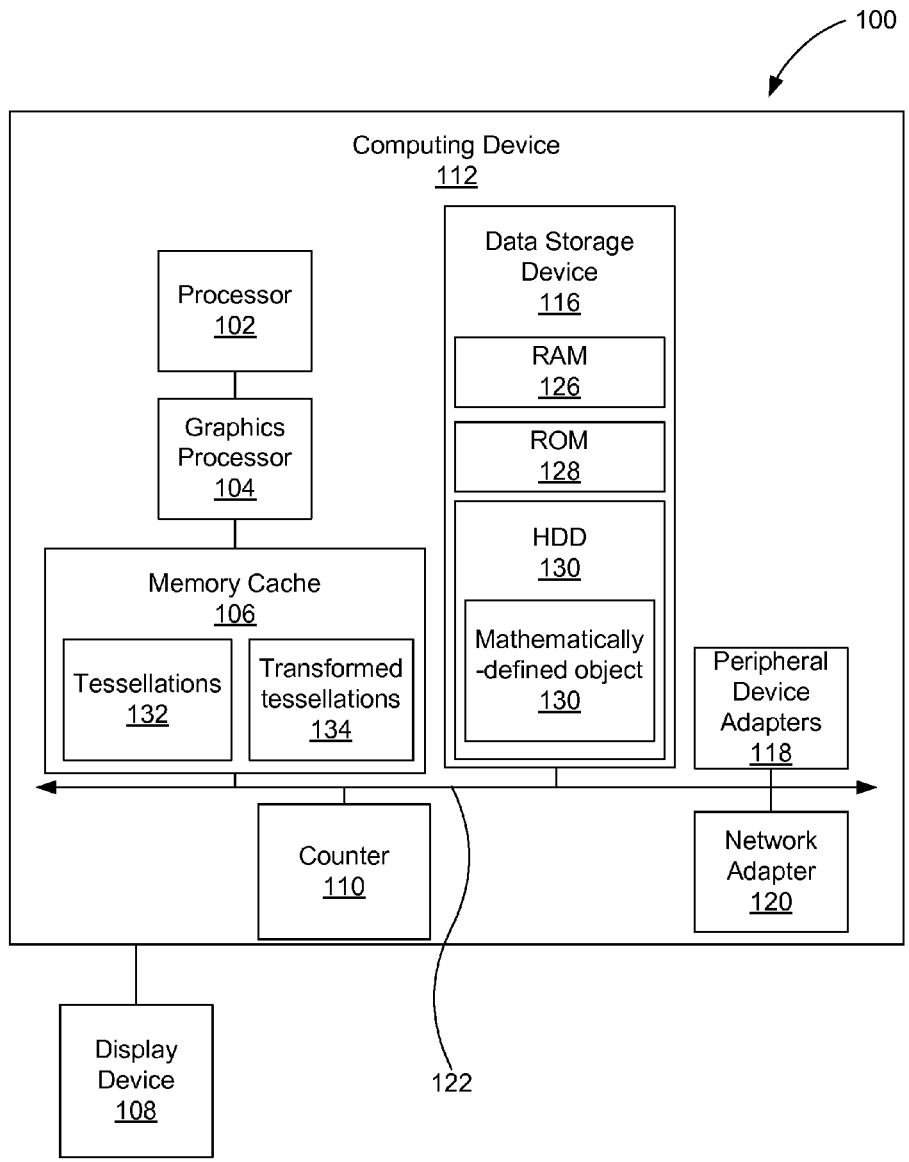
FIG. 1 is a diagram of a system for implementing a tessellation cache for object rendering, according to one example of principles described herein.

While tessellation computations can simplify object rendering, they still can occupy much of the processor's valuable computing bandwidth. Even more bandwidth is used when an object is subject to transformation. For example, when an object is scaled, translated, rotated, or skewed, a new tessellation and conversion pass is made to convert the original object according to the transformative operation.

As described above, one challenge in rendering an object, or in other words, converting an object from a mathematically-defined format to a rasterized format, is the processing time and computing bandwidth that the process uses. Each time a mathematically-defined object is to be rendered, the shape is broken down into smaller objects called tessellations. These tessellations are converted into a rasterized format through any number of mathematical operations. A tessellation process can be time-consuming; especially if an object is subject to transformative operations. When an object is transformed, the conversion process is repeated with each distinct transformation. Multiple renderings of the same object can likewise influence processing time as a tessellation and conversion process is performed each time an instance of the object is rendered.

In light of these and other issues, the present specification discloses a method and a system for reducing the processing time of object rendering. In particular, the present specification discloses a method that uses a tessellation cache to store the mathematically-defined object and the various transformations that are performed on the object before it is converted into a rasterized object. Storing the object and transformations before they are converted reduces the number of tessellation processes for an object with each subsequent transformation. This decreases processing time, decreases processing bandwidth usage, and increases processing speed to improve the overall efficiency of object rendering. Thus, more computing space is available to perform other operations, and a rasterized object is obtained quickly. A system for carrying out this method is also disclosed.

According to an example of the disclosure, the method begins by generating a mathematically-defined object. The mathematically-defined object is then tessellated. Tessellation creates more manageable object elements that can be processed quicker than the complete object. Next, the tessellations are stored in a memory cache that is communicatively coupled to the computing device. Caching the tessellations at this stage allows any type of transformation to be performed to the tessellations before they are converted to a rasterized object. Thus, the conversion from the mathematically-defined format to a rasterized format occurs once, after all transformations have been performed. Additionally, any subsequent renderings of the same object can call the stored tessellations from the memory cache to transform and convert the renderings. Thus, the initial tessellation of the object into smaller elements occurs once. Once all transformations have been completed, the mathematically-defined object is then converted into a rasterized object that can be displayed on a display device.

The present specification also discloses a system for carrying out object rendering using tessellation caches. An example of the system includes a processor that generates a mathematically-defined object, tessellates the mathematically-defined object, and stores the tessellations to a memory cache. The system also includes a graphics processor that converts the mathematically-defined object into a rasterized object, and displays the rasterized object. In this example, the system also includes a memory cache for storing the tessellations. Additionally, the system includes a display device, on which the rasterized object may be displayed.

As used in the present specification and in the appended claims, the term "mathematically-defined object" refers to objects defined by geometrical elements whose shape is defined by mathematical equations. Examples of geometrical elements include, but are not limited to points, lines, curves, and polygons. A cube whose edges are defined by a vector is an example of a mathematically-defined object.

Similarly, as used in the present specification and in the appended claims, the term "rasterized object" refers to objects defined by points of color, or pixels organized in a matrix. The pixels, when viewed together, create an object on a display device.

Additionally, as used in the present specification and in the appended claims, the term "tessellations" refer to small divisional elements of a larger object or the process of dividing a larger object into smaller elements. The elements are juxtaposed such that they do not overlap one with another and leave no gaps between their edges. In one example, the elements are uniformly sized and shaped.

Lastly, as used in the present specification and in the appended claims, the term "render" refers to the process of generating a rasterized object from a mathematically-defined object that can be displayed on a display device. In one example, rendering includes tessellation and conversion of an object.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with the example is included in at least that one example, but not necessarily in other examples. The various instances of the phrase "in one example" or similar phrases in various places in the specification are not necessarily all referring to the same example.

Referring now to the drawings, FIG. 1 is a diagram of a system (100) for implementing a tessellation cache for object rendering. The system (100) may include a processor (102) communicatively coupled to a computing device (112). Examples of a computing device (112) include, but are not limited to desktop computers, laptop computers, smart phones, personal digital assistants (PDAs), and personal computing devices. The processor (102) creates a mathematically-defined object file and stores the mathematically-defined object file in, for example, the data storage device (116). The mathematically-defined object file includes the mathematically-defined object (130); an object as defined by its geometrical components. For example, an object could be defined by the points, lines, curves, and polygons that comprise the object. The data file associated with the object may also include a number of aesthetic characteristics of the object. Examples of such aesthetic characteristics include, but are not limited to, shading, lighting, surface texture, and perspective angles.

The processor (102) further tessellates the mathematically-defined object (130). Tessellation divides the mathematically-defined object (130) into a pattern of smaller elements. In this state of tessellation, any transformation or conversion of the object can be performed. Additionally, rendering the tessellations (132) is quicker than rendering the larger object. This results in a shorter rendering period. It also reduces the computational burden on the processor (102) and frees the processor up to perform other processes.

According to an example of the system (100), the processor (102) may also perform various linear transformations to the tessellations (132) before they are converted. Examples of linear transformations that may be performed include, but are not limited to scaling, translation, rotation, and skewing.

Once all the tessellations (132) and transformations are complete, the graphics processor (104) may convert the mathematically-defined object (130) into a rasterized object that can be viewed and displayed on a display device (108). A rasterized object, as compared to a mathematically-defined object (130), is one that is defined by a grid of colored pixels rather than mathematical expressions of constituent geometric elements.

The system (100) may also include a memory cache (106) that is communicatively coupled to the processor (102), the graphics processor (104), and the computing device (112). In one example, the memory cache (106) stores the mathematically-defined object (130). Further, the memory cache (106) stores a number of tessellations (132) derived from the mathematically-defined object (130). According to this example, after a mathematically-defined object (130) has been tessellated and transformed, the processor (102) stores the transformed tessellations (134) in the memory cache (106).

According to an example of the system (100), once an object has been rendered, the processor (102) creates space on the memory cache (106). Creating space on the memory cache (106) clears processing space for future objects to be rendered. For example, the processor (102) may create space by erasing the memory cache (106). In another example, the processor (102) waits until the memory cache (106) is full before erasing it. In yet another example, the processor (102) writes over the data stored in the memory cache (106) as more data is stored to the memory cache (106).

The system (100) may also include a display device (108) communicatively coupled to the memory cache (106), the computing device (112), the processor (102), and the graphics processor (104). In this example, once an object has been rendered, the graphics processor (104) transmits the rasterized object to the display device (108). The display device (108) is any electronic display device that is capable of displaying a rasterized object. Examples of a display device (108) include, but are not limited to computer screens, personal computing device screens, a touch sensitive screen, a liquid crystal display (LCD), a plasma display, and a flat panel display. In one example, the system (100) displays the rasterized object on the display device (108) via a computer program such as, for example, an internet webpage or a computer-aided-drafting (CAD) program.

The system (100) further includes a counter (110) that counts the number of times a particular object is rendered. In an example of the system (100), after an object has been rendered a predetermined number of times, the memory cache (106) may be used to store the mathematically-defined object (130) and corresponding transformations (134). In one example, the predetermined number is user-defined. In another example, the predetermined number is defined by computer programming.

In yet another example, the predetermined number is dependent on the display medium. For example, if a rasterized object is displayed within an internet webpage, then the predetermined number may be, for example, between 2 and 7. In another example, if the rasterized object is displayed within a CAD program, then the predetermined number may be, for example, between 1 and 6. These predetermined numbers that depend on the display medium are used as examples only.

In the present example, for the purposes of simplicity in illustration, the computing device (112) and the display device (108) are separate computing devices communicatively coupled to each other through a network or other communication paths. However, the principles set forth in the present specification extend equally to any alternative configuration in which a number of these elements are combined in a number of configurations. As such, examples within the scope of the principles of the present specification include examples in which the computing device (112) and the display device (108) are implemented by the same computing device. Other examples of an alternative configuration include examples in which the functionality of the computing device (112) is implemented by multiple interconnected computers, for example, a server in a data center and a user's client machine. Still other examples of alternative configurations of the elements of FIG. 1 include examples in which a number of the computing devices (112) and display devices (108) communicate directly through a bus without intermediary network devices.

To achieve its desired functionality, the computing device (112) includes various hardware components. Among these hardware components may be at least one processor (102), at least one graphics processor (104), at least one data storage device (116), peripheral device adapters (118), and a network adapter (120). These hardware components may be interconnected through the use of a number of busses and/or network connections. In one example, the processor (102), the graphics processor (104), data storage device (116), peripheral device adapters (118), and a network adapter (120) may be communicatively coupled via bus (122).

The processors (102, 104) may include the hardware architecture for retrieving executable code from the data storage device (116) and executing the executable code. The executable code may, when executed by the processors (102, 104), cause the processors (102, 104) to implement at least the functionality of object rendering according to the methods of the present specification described. In the course of executing code, the processors (102, 104) may receive input from and provide output to a number of the remaining hardware units.

The data storage device (116) may include various types of memory modules, including volatile and nonvolatile memory. For example, the data storage device (116) of the present example includes Random Access Memory (RAM) (126), Read Only Memory (ROM) (128), and Hard Disk Drive (HDD) memory (130). Many other types of memory are available in the art, and the present specification contemplates the use of many varying type(s) of memory in the data storage device (116) as may suit a particular application of the principles described herein. In certain examples, different types of memory in the data storage device (116) may be used for different data storage needs. For example, in certain examples the processor (102) may boot from Read Only Memory (ROM) (128), maintain nonvolatile storage in the Hard Disk Drive (HDD) memory (130), and execute program code stored in Random Access Memory (RAM) (126).

Generally, the data storage device (116) may comprise a computer readable storage medium. For example, the data storage device (116) may be, but not limited to, an electronic, magnetic, optical, electromagnetic, infrared, or semiconductor system, apparatus, or device, or any suitable combination of the foregoing. More specific examples of the computer readable storage medium may include, for example, the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The hardware adapters (118, 120) in the computing device (112) enable the processors (102, 104) to interface with various other hardware elements, external and internal to the computing device (112). For example, peripheral device adapters (118) may provide an interface to input/output devices, such as, for example the display device (108), to create a user interface and/or access external sources of memory storage.

The peripheral device adapter (118) may also create an interface between the processors (102, 104) and a display device (108) or other media output device. A network adapter (120) may additionally provide an interface to a network, thereby enabling the transmission of data to and receipt of data from other devices on a network.

Figure 2:
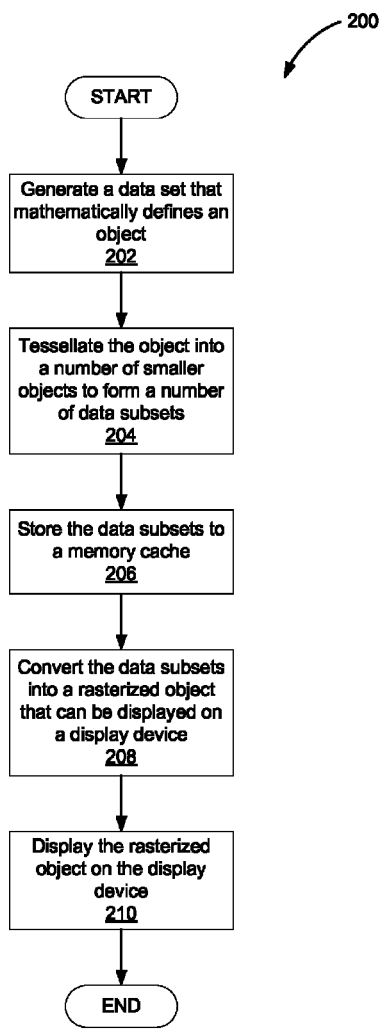
FIG. 2 is a flowchart showing a method for using a tessellation cache for object rendering, according to one example of principles described herein.

FIG. 2 is a flowchart showing a method for using a tessellation cache for object rendering (200). The method (200) includes, with the processor (FIG. 1, 102), generating a first data set that mathematically defines an object (block 202). A mathematically-defined object (130) is one that is defined by component geometrical elements that can be defined by mathematical equations. A cube defined by vectors is an example of a mathematically-defined object (130). A mathematically-defined object (130) can be transformed without any degradation of the data set. As described below, defining an object in this manner allows transformative operations to be performed on the object before it is rendered into a rasterized object.

The mathematically-defined object (130) is then tessellated into a number of smaller objects to form a number of data subsets (block 204). These smaller objects, called tessellations (132), utilize less processing space and time, and thus, can be converted more efficiently. The increased efficiency creates a quicker rendering and allows the processor to perform other operations.

According to an example of the method (200) the individual tessellations (132) are juxtaposed such that they do not overlap with one another and there are no gaps between adjacent tessellations (132). In this example, the tessellations (132) may comprise uniformly shaped and sized objects. The uniformity increases the efficiency of the tessellation and rendering, thus further increasing operational efficiency. In this example, the tessellations (132) may comprise triangular geometries.

After the processor (FIG. 1, 102) has completed the tessellation, the data subsets may be stored in the memory cache (FIG. 1, 106) communicatively coupled to the processor (block 206). As described above, tessellation and rendering is a computationally expensive procedure. Typically, such tessellation and rendering occurs every time a mathematically-defined object (130) is converted into a rasterized object. By storing the data subsets to the memory cache (FIG. 1, 106), an object is not tessellated each time it is to be rendered and displayed.

According to this example, once a mathematically-defined object (130) is tessellated and the corresponding tessellations (132) are stored to the memory cache (FIG. 1, 106), any subsequent renderings of that same mathematically-defined object (130) can call the tessellations (132) from the memory cache (FIG. 1, 106) and perform the conversion. Thus, the number of times a given object is tessellated is reduced. This reduces the time to display the rasterized object. Additionally, this frees up the computing bandwidth of the processor (FIG. 1, 102) to perform other operations.

The method (200) also includes converting the data subsets into a rasterized object that can be displayed on a display device (FIG. 1, 108) (block 208). Each time a mathematically-defined object (130) is used by a display device (FIG. 1, 108), the tessellations (132) are converted into a rasterized object before it can be displayed. Because a rasterized object utilizes less processing, displaying it frees the graphics processor (FIG. 1, 104) to perform other operations. Once the object has been rendered, the method (200) may display the rasterized object on the display device (FIG. 1, 108) (block 210).

Figure 3:
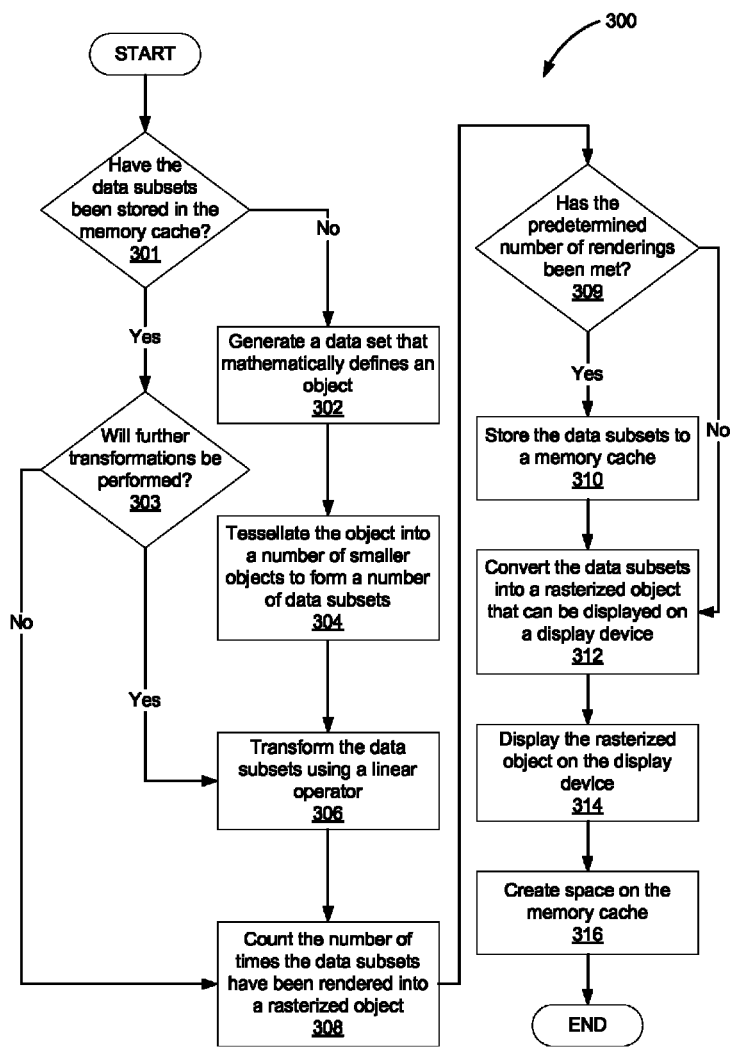
FIG. 3 is a flowchart showing a method for using a tessellation cache for object rendering, according to another example of principles described herein.

FIG. 3 is a flowchart showing a method for using a tessellation cache for object rendering (300). The method may begin by determining whether data sets representing the object tessellations (132) and any transformations (134) that have been performed have already been stored in the memory cache (FIG. 1, 106) (block 301). According to this example, any transformations (134) may be represented by a transformation matrix. The transformation matrix mathematically-defines the relationship between the tessellations (132) before they have been transformed and after they have been transformed. For example, let x be the original data set prior to transformation. Further, let x' be the data set as transformed by the transformation matrix C. Consequently, the equation x'=Cx defines this relationship.

If data sets representing the object tessellations (132) and transformation matrix were not previously stored in the memory cache (FIG. 1, 106) (block 301, determination NO), then the method (300) continues by generating, with a processor (FIG. 1, 102), a first data set that mathematically defines an object (block 302). If, however, the data sets representing the object tessellations (132) and transformation matrix (134) have already been stored in the memory cache (FIG. 1, 106) (block 301, determination YES), it may then be determined if subsequent transformations (134) will be performed. If subsequent transformations (134) will be performed, (block 303, determination YES), this can be done at block 306 as will be described in more detail below. If, however, subsequent transformations (134) will not be performed, (block 303, determination NO), the method can continue at block 308 as will be described in more detail below.

At block 304, the mathematically-defined object (130) is tessellated into a number of smaller objects to form data subsets. These smaller objects, called tessellations (132), utilizes less processing space and time, and thus can be transformed and converted more efficiently. The increased efficiency creates a quicker rendering and allows the processor (FIG. 1, 102) to perform other operations. According to an example of the method (300) the individual tessellations (132) are juxtaposed such that they do not overlap with one another and there are no gaps between adjacent tessellations (132).

In an example of the method (300), after the mathematically-defined object (130) has been tessellated into a number of smaller objects to form data subsets, the tessellations (132) may then be linearly transformed using a linear operator (block 306). Examples of linear transformations that may be performed include, but are not limited to scaling, translation, rotation, and skewing. Transforming the object as a mathematically-defined object (130) ensures that none of the object information is lost or degraded as the object is transformed. By comparison, transforming a rasterized object in this fashion could result in degradation of the display.

According to an example of the method (300), if data sets representing the object (130) and the transformation matrix (134) were previously stored in the memory cache (block 301, determination YES), any subsequent transformations can be made by comparing the cached data sets to the subsequently transformed data set using the transformation matrix (134) and any subsequent transformation matrix (134). Continuing the example, let x' represent the cached data set, let C represent the cached transformation matrix (134), let M represent the subsequent transformation matrix representing a subsequent transformation, and let y represent the subsequently transformed data set transformed by M. The equation $y=(MC^{-1})x'$ represents the mathematical relationship between the stored data set x' and the subsequent transformed data set y. In this example, the stored data set can be subsequently transformed without having to tessellate the data set.

In one example, the method (300) may include counting the number of times the tessellations (132) have been rendered into a rasterized object (block 308). According to this example, the predetermined number represents a threshold after the attainment of which the tessellations (132) and any transformations (134) may be stored in the memory cache for subsequent transformation and conversion.

A determination is made as to whether the predetermined threshold of rendering iterations has been met (block 309). If the predetermined number of renderings is met (block 309, determination YES), the method (300) continues by storing the tessellations (132) and any transformations to the memory cache (FIG. 1, 106) (block 310). As described above, rendering tessellations (132) is a computationally expensive process that reduces processing efficiency. Storing the tessellations (132) and transformations (134) in the memory cache (FIG. 1, 106) before they are rendered reduces the number of tessellations (132) performed to an object which would otherwise occur each time it is rendered. This frees up computational bandwidth, and reduces the time to transform and convert an object. Similarly, according to this example, multiple transformations can be performed on an object before it is converted.

According to this example, once a mathematically-defined object (130) is tessellated and transformed, and the corresponding tessellations (132) are stored to the memory cache (FIG. 1, 106), any subsequent renderings of that same mathematically-defined object (130) can call the tessellations (132) from the memory cache (FIG. 1, 106) and perform the conversion of the object as demonstrated in block 306 and 310. Thus, the number of times a given object is tessellated is reduced. This reduces the time to display the rasterized object. Additionally, this frees up the computing bandwidth of the processor (FIG. 1, 102) to perform other operations.

If the predetermined number of renderings is not met (block 309, determination NO), or after the tessellations (132) are stored in the memory cache (FIG. 1, 106) (block 310), the method (300) continues by converting the data subsets into a rasterized object that can be displayed on a display device (FIG. 1, 108) (block 312). Each time a mathematically-defined object (130) is used by a display device, the tessellations (132) are converted into a rasterized object before the object is displayed. Because a rasterized object utilizes less processing, displaying it frees the graphics processor (FIG. 1, 104) to perform other operations.

The method (300) continues by displaying the rasterized object on the display device (FIG. 1, 108) (block 314). The method (300) may then create space on the memory cache (FIG. 1, 106) (block 316). Creating space on the memory cache (FIG. 1, 106) clears processing space for future objects to be rendered. For example, the processor (FIG. 1, 102) may create space by erasing the memory cache (FIG. 1, 106). In another example, the processor (FIG. 1, 102) waits until the memory cache (106) is full before erasing it. In yet another example, the processor (FIG. 1, 102) writes over the data stored in the memory cache (FIG. 1, 106) as more data is stored to the memory cache (FIG. 1, 106).

The methods described above may be accomplished in conjunction with a computer program product comprising a computer readable medium having computer usable program code embodied therewith that, when executed by a processor, performs the above processes and methods. Specifically, the computer usable program code, when executed by a processor, generates a data set that mathematically defines an object; tessellates the object into a number of smaller objects to form a number of data subsets; storing the data subsets in a memory cache; converts the data subsets into a rasterized object; and displays the rasterized object on a display device.

The preceding description has illustrated a method and system for object rendering using tessellation caches. The method may generate a first data set that mathematically defines an object and tessellate the object into a number of smaller elements to form data subsets. The method may then store the data subsets to a memory cache. Next, the tessellations (132) are rendered into a rasterized object that can be displayed on a display device. A system for accomplishing this method has also been disclosed. The current method and system reduce the number of times that a given mathematically-defined object will be rendered, thus freeing up computational bandwidth, and increasing the efficiency of object rendering.

The preceding description has been presented to illustrate and describe examples and examples of the principles described. This description is not intended to be exhaustive or to limit these principles to any precise form disclosed. Many modifications and variations are possible in light of the above teaching.

What is claimed is:

1. A method of rendering an object comprising:
   with a processor, determining whether a data set representing an object is stored in a memory cache, in which the data set comprises a transformation matrix that defines a previous transformation of the object;
   generating a data set that mathematically defines an object when the data set representing the object is not stored in the memory cache;
   tessellating the object into a number of smaller objects to form a number of data subsets;
   transforming the data subsets using a linear operator;
   counting the number of times the data subsets have been rendered into a rasterized object;
   storing the data subsets to the memory cache when the number of times the data subsets have been rendered reaches a predetermined number;
   converting the transformed data subsets into a rasterized object; and
   displaying the rasterized object on a display device.

2. The method of claim 1, in which the tessellated smaller objects comprise similarly shaped and sized triangular geometries.

3. The method of claim 1, in which the data set comprises information defining the aesthetic qualities of the object.

4. The method of claim 3, in which the aesthetic qualities of the object comprise object shading, object lighting, object surface texture, object perspective angles, or combinations thereof.

5. The method of claim 1, further comprising creating space on the memory cache.

6. The method of claim 5, in which creating space on the memory cache further comprises erasing the data subsets from the memory cache.

7. The method of claim 1, further comprising storing the transformed data subsets in the memory cache.

8. The method of claim 7, further comprising:
   calling the stored transformed data subsets; and
   further transforming the stored transformed data subsets using a linear operator.

9. The method of claim 7, in which storing the transformed data subsets in the memory cache comprises storing the data set that mathematically defines an object and storing a transformation matrix corresponding to the transformed data subsets.

10. The method of claim 8, in which further transforming the stored transformed data subsets using a linear operator is performed independent of any additional tessellating.

11. The system of claim 1, in which the predetermined number is based on the display medium.

12. A system for rendering an object comprising:
    a processor to:
      determine whether a data set representing an object is stored in a memory cache, in which the data set comprises a transformation matrix that defines a previous transformation of the object;
      generate a data set that mathematically defines an object when the data set representing the object is not stored in the memory cache;
      tessellate the object into a number of tessellations to form data subsets;
      transform the tessellations multiple times using a number of linear operators;
      store the transformed tessellations in a memory cache;
      call the transformed tessellations from the memory cache to further transform the tessellations; and
      store the data subsets representing the tessellated object in the memory cache if a number of times that the data subsets are rendered into a rasterized object exceeds a predetermined number;
    a graphics processor to:
      convert the transformed tessellations into a rasterized object; and
      display the rasterized object on a display device;
    a memory cache to receive and store the data subsets; and
    a counter to record the number of times that the data subsets are rendered into the rasterized object.

13. The system of claim 12, in which the processor further creates space on the memory cache.

14. The system of claim 13, in which the processor further erases the data subsets from the memory cache when the memory cache is full.

15. A computer program product for rendering an image, the computer program product comprising:
    a non-transitory computer readable storage medium comprising computer usable program code embodied therewith, the computer usable program code comprising:
      computer usable program that, when executed by a processor, determines whether a data set representing an object is stored in a memory cache, in which the data set comprises a transformation matrix that defines a previous transformation of the object;
      computer usable program code that, when executed by a processor, generates a data set that mathematically defines an object when the data set representing the object is not stored in the memory cache;
      computer usable program code that, when executed by a processor, tessellates the object into a number of smaller objects to form data subsets; computer usable program code that, when executed by a processor,
      computer usable program code that, when executed by a processor, stores the data subsets in a memory cache if a number of times that the data subsets are rendered into a rasterized object exceeds a predetermine number;
      computer usable program code that, when executed by a processor, transforms the data subsets multiple times using a number of linear operators before converting the data subsets into a rasterized object;
      computer usable program code that, when executed by a processor, counts the number of times the data subsets have been rendered into a rasterized object;
      computer usable program code that, when executed by a processor, stores the data subsets to the memory cache when the number of times the data subsets have been rendered reaches a predetermined number;
      computer usable program code that, when executed by a processor, converts the transformed data subsets into the rasterized object; and
      computer usable program code, that when executed by a processor, displays the rasterized object on the display device.

16. The computer program product of claim 15, further comprising:
- computer usable program code that, when executed by a processor, creates space on the memory cache;
- computer usable program code that, when executed by a processor, counts the number of times the data subsets are rendered into the rasterized object; and
- computer usable program code that, when executed by a processor, transforms the data subsets using a linear operator.

* * * * *